United States Patent [19]

Roberts, Jr.

[11] Patent Number: 4,809,500
[45] Date of Patent: Mar. 7, 1989

[54] TRANSIENT CONTROL SYSTEM FOR GAS TURBINE ENGINE

[75] Inventor: William C. Roberts, Jr., Jupiter, Fla.

[73] Assignee: United Technologies Corporation, Hartford, Conn.

[21] Appl. No.: 10,045

[22] Filed: Feb. 3, 1987

[51] Int. Cl.$^4$ .............................................. F02K 1/17
[52] U.S. Cl. .................................................. 60/235
[58] Field of Search ................ 60/233, 235, 236, 237, 60/239, 242

[56] References Cited

U.S. PATENT DOCUMENTS

| | | | |
|---|---|---|---|
| 3,041,822 | 7/1962 | Embree | 60/242 |
| 3,656,301 | 4/1972 | Katz | 60/237 |
| 3,747,344 | 7/1983 | Porter et al. | 60/242 |
| 4,159,625 | 7/1979 | Kerr | 60/242 |
| 4,467,600 | 8/1984 | Peikert | 60/242 |

Primary Examiner—Louis J. Casaregola
Attorney, Agent, or Firm—Norman Friedland

[57] ABSTRACT

A secondary control for a gas turbine engine powering fighter class of aircraft serves to modify the primary control solely during transient engine operation primarily in the combat box of between approximately 0.4 to 1.2 Mach number at an altitude between 10,000 to 30,000 feet of the flight envelope and does maintain higher compressor rpm, turbine inlet temperature, and engine air flow at the idle or part power thrust settings by concomitantly adjusting fuel flow and engine exhaust nozzle area thereby enhancing thrust response, low cycle fatigue life, and engine stability.

6 Claims, 4 Drawing Sheets

4,809,500

TRANSIENT CONTROL SYSTEM FOR GAS TURBINE ENGINE

TECHNICAL FIELD

This invention relates to aircraft engines of the turbine type of power plant and particularly to the control and scheduling of the power plant to achieve certain performance characteristics within the flight spectrum.

BACKGROUND ART

This invention is particularly concerned with military aircraft as opposed to civilian or commercial aircraft and even more particularly to the class of aircraft that would fall in the fighter class. As is well known, fighter aircraft as presently perceived are designed for the combat box within the flight spectrum. Engine operation at 0.9 Mach No. at an altitude of 15,000 feet is representative of the combat box. Because of the nature of its flight mission this class of aircraft typically undergoes rather violent maneuvers, calling for much manipulation of the power lever to change thrust of the engine so as to accelerate and decelerate at very severe conditions. When the aircraft undergoes these maneuvers the pilot will typically exercise power lever movements called bodies, chops, snaps and the like which result in engine speed, temperature, and airflow excursions. Under such maneuver excursions the rotor speeds of the fan and high pressure compressor rotors will vary from a high level of the operating spectrum called intermediate power to a lower level called part power or idle power. While these rotor speeds and thrusts are varying during maneuver excursions, the variable geometry parts of the engine are also moving. Fan and high compressor vane angles are changing with rotor speed and the variable area exhaust nozzle is changing position, typically +5% to +10% from the intermediate power area as the engine moves toward idle power, decelerates. Exhaust nozzle area normally closes 5% to 10% as the engine accelerates.

To more fully understand the background of this technology the graphs in FIG. 1 show a typical schedule of a military aircraft engine designed to operate at 0.9 Mach No. at an altitude of 15,000 feet. The graphs describe the speed of the high compressor and fan pressure rotors, (N2 and N1 respectively), the inlet temperature of the turbine, the total airflow at the fan inlet (Wat2) and the area of the exhaust nozzle (Aj) at various thrust levels. These parameters are typical in a single spool or multiple spool axial flow turbine power plant either of the straight jet or fan jet configuration; the latter, for example, being exemplified by the F100 engine manufactured by Pratt & Whitney Aircraft, a division of United Technologies Corporation, the assignee of this patent application.

Essentially, as can be seen from these graphs (FIG. 1), the thrust level varies from zero thrust (idle) to approximately 12,000 pounds of thrust (military power) at 0.9/15,000 ft. The area of the opening of the exhaust nozzle is pre-selected at 3.0 ft.$^2$ for idle and slightly smaller, 2.8 ft.$^2$ for intermediate power operation. These are optimum exhaust nozzle areas for steady state engine operation. Reference letter A on all the graphs represent the military power condition (12,000 pounds thrust) during normal operation of the aircraft. A typical snapdown in thrust desired would schedule the power to reduce to perhaps, say 2-4 thousand pounds of thrust or even idle (reference letter B) by reducing the amount of fuel to the combustor of the engine and increasing the exhaust nozzle area to 3.0 square feet. The N1 and N2 speeds, turbine temperature, and airflow will be at values in accordance with the thrust decreasing along the 3.0 ft.$^2$ Path, (E). For example, at idle, T4 would be at approximately 1200° F. N1 and N2 speed would be at approximately 5000 RPM and 10,000 RPM, respectively and engine air flow would be at approximately 100 pounds/sec.

From the foregoing, it will be appreciated that under a typical schedule there is a significant decrease in speed, temperature and airflow in the engine when the power plant undergoes a transient from military power to idle power. Likewise, there is a significant increase in speed, temperature, and airflow when the powerplant undergoes a transient from idle or part power up to military power, just the reverse of the down power transient. Such scheduling is exemplary of fighter aircraft engines and represents a typical excursion of the internal engine performance characteristics.

What is also well known is the fact that the components of an engine designed for fighter type aircraft (fighter class) have a shorter life span than a similar part used in an engine designed to power commercial or non-fighter types of aircraft. Obviously, the severity of the thrust transients and the rapidity of such transients are more evidenced in the military engines than in non-military engines.

We have found that we can improve the power plant by including in addition to the heretofore known and above described schedule a different schedule utilized solely during predetermined transient conditions so as to afford the following benefits:

(1) improved life cycle fatigue (LCF) life,
(2) improved engine stability/operability,
(3) improved performance, and
(4) reduced engine thrust transient time.

In preliminary analytical studies it has been determined that changing the scheduling of the power plant in accordance with this invention, there is a likelihood of attaining 1.4× and 2.7× F/M life benefits of the high and low rotors, respectively. Such predictions are based on assessment of the high physical rotor speed at idle on the surface flow fracture mechanics life for the engine evaluated.

DISCLOSURE OF INVENTION

An object of this invention is to provide for fighter aircraft powered by a turbine type power plant, a secondary control mode solely utilized during maneuvers, transient thrust conditions, that concomitantly reduces or increases fuel flow to the engine and significantly opens and closes the exhaust nozzle area so as to reduce or increase thrust while obtaining higher levels of rotor speed, burner and turbine temperatures and engine air flow at part power or idle power conditions than would be otherwise achieved by the primary control mode.

A feature of this invention is to provide a secondary scheduling system that maintains higher rotor speeds, higher combustor/turbine temperatures and engine airflow at part power that responds to the rate of change of the power lever as well as the movement range of the power lever operated within the cockpit of the aircraft.

The foregoing and other features and advantages of the present invention will become more apparent from the following description and accompanying drawings.

BEST MODE FOR CARRYING OUT THE INVENTION

This invention is intended to be utilized on engines of the type exemplified by the PW F100 engine manufactured by Pratt & Whitney Aircraft, a division of United Technologies Corporation, the assignee of this patent application, but it is to be understood that the invention is not limited thereto. However, the invention is contemplated to be utilized in turbine type power plants where not only is the flow of fuel regulated to the engine's burner, but also where the area of the exhaust nozzle is varied during thrust transients to achieve the benefits enumerated above.

While a description of the details of the engine is not necessary for an understanding of the invention and are omitted herefrom for the sake of simplicity and convenience, suffice it to say that the engine is of the twin spool axial flow type. As is typical in these configurations, the N2 spool comprises stages of high pressure compressors driven by the high pressure turbine and the N1 spool comprises stages of the fan and stages of the low pressure compressors driven by the stages of low pressure turbine. A burner typically of the annular type, is disposed between the compressor exit and turbine inlet and serves to accelerate and heat the engine's working medium in order to energize the gases sufficiently so as to power the turbines and generate thrust. (The symbol Pb indicates burner pressure).

Figure 2:
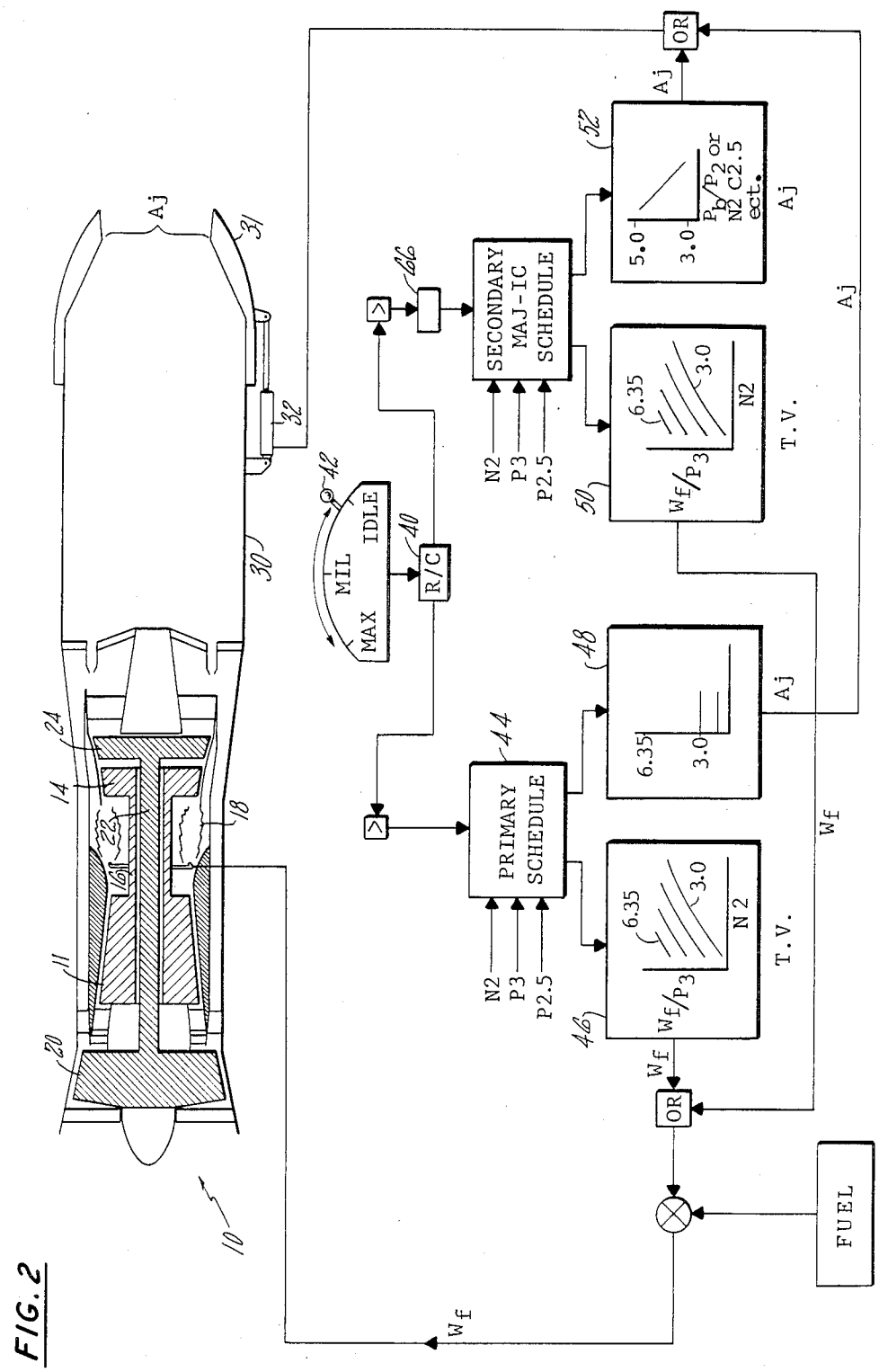
FIG. 2 is a plan view representing a typical gas turbine power plant and a schematic in block diagram illustrating the function of the primary schedule and the secondary schedule illustrating this invention.

As is shown schematically in FIG. 2, the turbine type power plant generally indicated by reference numeral 10 comprises the gas generator section including the high pressure compressor 11 and high pressure turbine 14 interconnected by the high speed shaft 16. The gas generator burner 18 is disposed therebetween and serves to combust fuel to energize the engine's working medium. The fan/low pressure compressor 20 is interconnected by low speed shaft 22 to the low pressure turbine 24. The high pressure spool and low pressure spool are not mechanically connected to each other but rotate independently.

The engine also includes an augmentor 30 receiving the engine's working medium discharging from the low turbine. Ultimately, the engine's working medium is discharged from the engine through the variable area exhaust nozzle ($A_j$) generally indicated by reference numeral 31. A suitable actuator 32 serves to position the exhaust nozzles so as to control the area of the discharge opening which is adjusted as a function of the engine's operation schedule.

Suffice it to say that the burner fuel flow and area of the exhaust nozzle are controlled in accordance with a predetermined schedule selected to achieve optimum engine operation over the engine's flight envelope. In modern day aircraft an electronic controller is generally employed which monitors a plurality of engine operating parameters and calculates their value to adjust the fuel flow and engine's geometry to achieve optimum operation. This invention contemplates the existence of this schedule whether it be through an electronic, hydraulic or hydro-mechanical control, and such a schedule is referred to hereinafter as the primary schedule.

Again referring to FIG. 2 to best understand this invention, a typical scheduling scheme shown schematically in block diagram is described to present the best mode. It is to be understood, however, and will be appreciated by one skilled in the art, that once the concept is understood, the implementation of this invention can be easily accommodated by changes made to existing scheduling mechanism. In a digital type control, for example, a suitable chip can be designed and integrated into the existing computer package.

As illustrated in FIG. 2, a rate of change sensor 40 serves to measure the rate of change of the power lever 42 typically operated from the cockpit of the aircraft. A rate of change less than a predetermined value, say 50°/second in either polarity will cause the input signal to be processed by the primary scheduling control 44.

Figure 1:
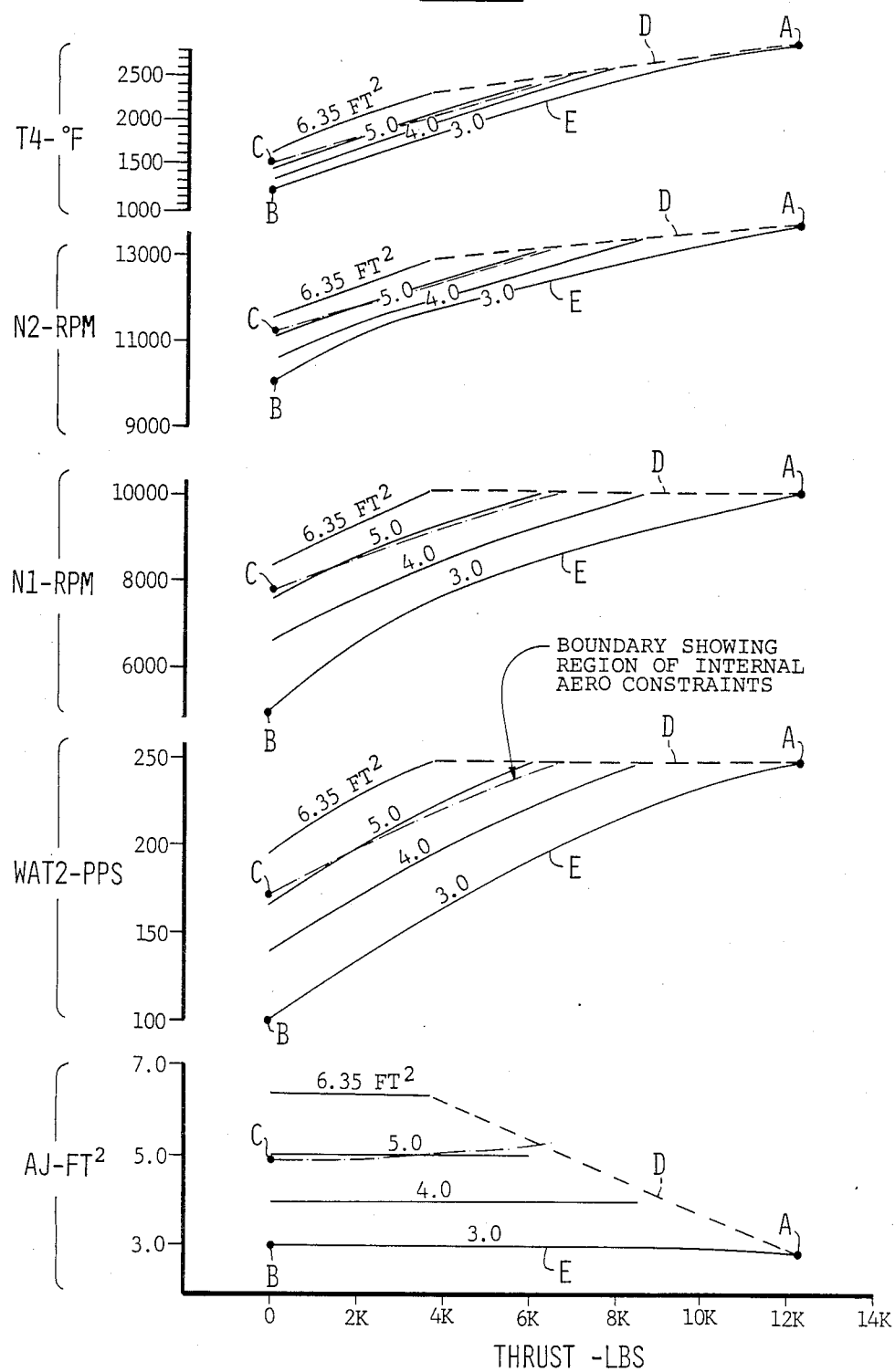
FIG. 1 is a plurality of charts showing a family of curves for different open areas of the exhaust nozzle for a plurality of engine operating parameters operating over the thrust spectrum of a gas turbine type power plant.

A suitable electronics digital control may be the EEC-104 manufactured by the Hamilton Standard Division of United Technologies Corporation, the assignee of this patent application. As mentioned above the primary schedule monitors a plurality of engine operating parameters like rotor speed (N1), compressor discharge pressure (P3) compressor inlet pressure (P2) or intermediate compressor inlet pressure (P2.5) and others and computes their value to operate the engine automatically to achieve optimum engine operation while avoiding surge, overtemperature and the like. As noted, the primary scheduling control 44 serves to produce at least two output signals. One being the gas generator fuel flow (Wf) which is suitably calculated in the function generator identified by reference numeral 46. The other is the area of the exhaust nozzle (Aj) which is calculated in the function generator indicated by reference numeral 48. The actual schedule is illustrated in the graphs of FIG. 1. As was mentioned in the above, a typical schedule for the bodies and snaps is illustrated by the curve for 3.0 ft.$^2$ opening of Aj where the power lever is manipulated between military and idle settings.

In accordance with this invention, if the rate of change of the power lever 42 is greater than a predetermined value say 50?/second, the input signal will then be processed by the secondary schedule hereinafter referred to as the MAJ-IC mode which is an acronym for Max AJ Idle Control. While shown as two separate control entities, as was mentioned above MAJ-IC mode could be easily implemented in the electronic digital control. The schedule will in this mode be changed so that the rate of fuel delivered to the engine will follow the schedule identified by the AJ=3.0 to 5.0 curves noted in the function generator 50 of the MAJ-IC mode. At idle the Aj will be activated to open to a maximum of 5 sq. feet instead of the 3.0 sq. feet that was the value of the heretofore known schedule as shown in the function generator 52. At any interim part power condition Aj will be scheduled to open less than 5 square feet and the exact amount of opening will be a function of an engine parameter such as burner pressure ratio, PB/P2, or corrected rotor speed. N2C2.5 according to a schedule shown in 52. 2.5 is a standard corrective factor using the values at the 2.5 station of a known set engine, as for example, the F-100 model, supra.

Figure 4:
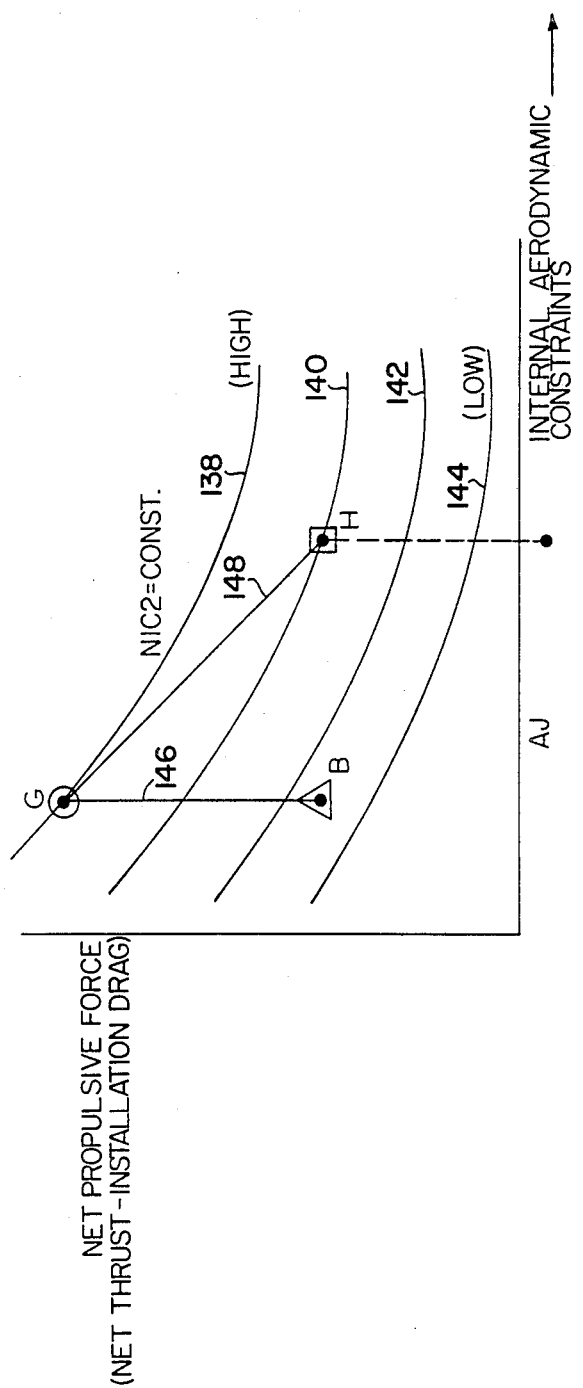
FIG. 4 is a graph of a plot showing net propulsive force vs. nozzle area ($A_j$).

An advantage of secondary exhaust area scheduling provided according to the present invention compared with prior art control systems is depicted in FIG. 4. Curves 138, 140, 142 and 144 show net propulsive force as a function of exhaust area (AJ) with fan rotor corrected speed N1C2 (C2 being the corrective factor at the 2 station) at corresponding constant rotor speed values. With existing control systems, a deceleration from intermediate thrust to low thrust (curve 146) with little or no increase in exhaust area (AJ) results in a large reduction in low rotor ($N_1$) speed. Throttle response is adversely affected since $N_1$ rotor speed must substantially increase in order for engine thrust to subsequently return to intermediate thrust (G). The large rotor speed excursion reduces the rotor low cycle fatigue (LCF) life drastically. Also, the smaller low power exhaust area reduces low speed compressor stability.

In contrast, secondary exhaust nozzle scheduling system of the present invention schedules the exhaust area to open in coordination with other engine parameters. As indicated by curve 148, identical levels, of low thrust can be obtained at higher low rotor ($N_1$) speeds (H). With a control system of the present invention rotor speeds at low thrust are higher than are obtained with existing control systems since thrust level is not only dependent upon a reduction in rotor speed but rather is significantly affected by the larger exhaust area. Therefore the secondary exhaust nozzle control system of the present invention provides dramatic improvement in thrust response because the engine spool speeds do not have to change significantly. The reduced rotor speed excursions correspondingly increase rotor low cycle fatigue (LCF) life. Moreover, the larger exhaust area at low thrust levels enhances compression systems stability. The larger exhaust area (AJ) reduced back pressure on the low pressure compressor by means of a bypass duct. Since the low pressure turbine is "unchoked" at low power, the corresponding reduction in nozzle pressure lowers the high pressure compressor operating line and hence enhances high compressor stability.

The new schedule provided by the MAJ-IC mode is shown in FIG. 1 and represented by the dashline D.

It is obviously apparent that by virtue of the MAJ-IC mode schedule all of the engine operating parameters are now at a much higher value for excursions from military power to idle power than they are from the primary schedule. The T4 excursion is reduced 30%. N2 and N1 speed excursions are reduced by 45% and 66% respectively and engine air flow excursion is reduced to 55 pps from 146 pps. This is accomplished without changing the thrust production of the engine and hence does not adversely affect aircraft maneuverability. One of the advantages obviously is that the excursions for these maneuvers is reduced significantly over the excursions for the identical maneuvers when solely the primary schedule is employed. This has the benefit of enhancing the LCF life since the strain on the engine's components evidences a less severe cycle, particularly in the hot section of the engine.

It has been estimated that since the resulting strain range on engine parts (hot and cold) between military and idle has been significantly reduced, the LCF severity of these transient engine operations on engine parts life will be reduced thereby increasing life by approximately 39%, the engine stability will be increased approximately 24% and thrust transient time will be reduced approximately 42%.

Figure 3:
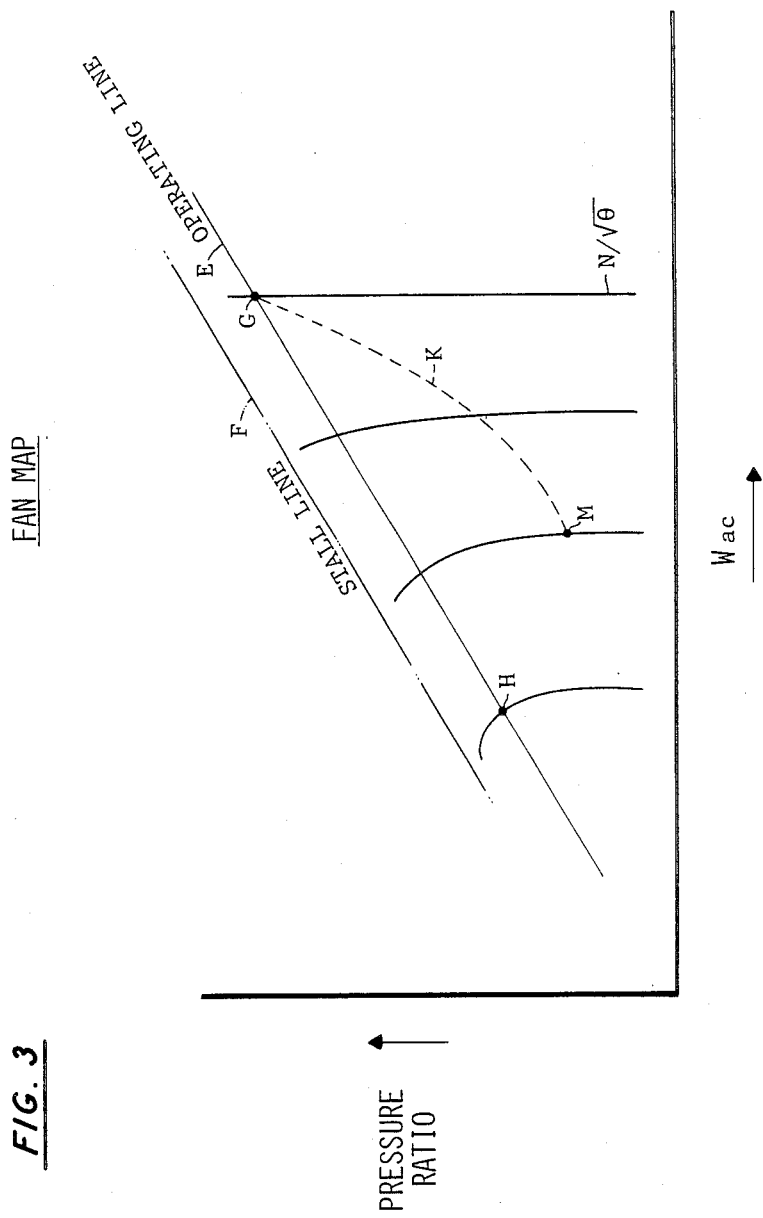
FIG. 3 is a graph illustrating the affect of this invention as demonstrated on a typical fan map of an axial flow fan.

Another advantage is the improvement in the engine stability which can best be understood by referring to the graph in FIG. 3 illustrating a typical fan map for an axial flow fan. As noted, the engine operating line E is plotted against compression ratio (PR) (ordinate) and airflow (Wac) (abscissa) for give lines of corrected speed ($N\sqrt{\theta}$). As noted, the operating line E is spaced from the stall line F and the difference between the stall, line and operating line for any given corrected fan speed defines the stall margin. The larger the stall margin the better the engine's stability, particularly during transients. The typical schedule for these transients provided by the primary schedule would operate the engine along the operating line E from point G to H. The MAJ-IC mode would alter the schedule for the same transients so as to operate along the dash line K from point G to point M. The increase in stall margin is self evident. Hence the stability of the engine during these transients would inherently improve. The high pressure compressor also experiences a significant stall margin increase in the MAJ-IC mode (see fan map for similar results)

Obviously, since under the MAJ-IC mode schedule the engine is operating at higher speeds and temperatures, its response to a demand for increased power will significantly improve. This will reduce the engine thrust transient time which is very desirable in fighter aircraft.

To prevent inadvertent overusage of fuel unnecessarily, that is to shift from the MAJ-IC mode to the primary mode when the transient operation is not being fully utilized, a timer is contemplated. If the power lever 42 is inactive for a predetermined period of time, say 1 minute, and the schedule is in the MAJ-IC mode the timer 66 will automatically transfer the input signal from the rate of change sensor 40 to the primary schedule 44. Hence the engine will operate at the 3.0 sq. ft. curve of the operating schedule.

Although this invention has been shown and described with respect to detailed embodiments thereof, it will be understood by those skilled in the art that various changes in form and detail thereof may be made without departing from the spirit and scope of the claimed invention.

We claim:

1. For a gas turbine engine for producing trust to propel aircraft having a variable area exhaust nozzle and being operable over a given flight envelope including a combat box of a given flight Mach number and altitude, a primary control system for monitoring given engine operating parameters for controlling the rate of fuel delivered to said engine and said variable area exhaust nozzle, secondary control means operable primarily within said combat box but not solely and solely during transients of said gas turbine engine operation to further control said fuel delivered to said engine and said variable area exhaust nozzle to attain a higher part power and idle rotor speeds of said engine than is attained by said primary control.

2. For a gas turbine engine as in claim 1 including a power lever for inputting thrust demands to said primary control system, means responsive to the rate of charge of said power lever position for producing a signal, said secondary control system being responsive to said rate of change signal for activating said secondary control system when said rate of change exceeds a predetermined value.

3. For a gas turbine engine as in claim 2 including a timing device for switching from said secondary control system to said primary control system when said power lever remains in a given position for a given length of time or rate of change of power lever position is small, less than predetermined value for a given or predetermined length of time.

4. For a gas turbine engine as in claim 2 wherein said secondary control system is operable in both a decreasing and increasing thrust mode whereby the thrust produced by said engine increases and decreases during transient conditions.

5. For a gas turbine engine developing thrust to power aircraft and having a variable area exhaust nozzle and being operable over a given flight envelope including a combat box of a given altitude and flight Mach number within said flight envelope, a primary control system for monitoring given engine operating parameters for controlling the fuel delivered to said engine and the exhaust nozzle jet area of said variable area exhaust nozzle, secondary control means operable primarily within said combat box and solely during part power transients of said gas turbine engine to further control said fuel delivered to said engine and said variable area exhaust nozzle to attain higher rotor speeds of said engine, a higher turbine inlet temperature and higher engine air flow for each part power thrust value.

6. For a gas turbine engine as in claim 5 including a power lever operable at various movement rates between given thrust settings, means responsive rate of change of said power lever position for producing a signal, said secondary control being responsive to said signal for activating said secondary control wherein the area of said variable area exhaust nozzle is significantly increased over the area of said variable area exhaust nozzle when controlled by said primary control.

* * * * *

UNITED STATES PATENT AND TRADEMARK OFFICE
CERTIFICATE OF CORRECTION

PATENT NO. : 4,809,500

DATED : March 7, 1989

INVENTOR(S) : William C. Roberts, Jr. and Syed J. Khalid

It is certified that error appears in the above-identified patent and that said Letters Patent is hereby corrected as shown below:

On the title page
Element (75): Add Syed J. Khalid, Palm Beach Gardens, Florida, as a co-inventor Column 6, line 51: after "producing" change "trust" to "thrust"

Column 6, line 68: before "of said" change "charge" to "change"

Column 8, line 14: after "responsive" insert --to the--

Signed and Sealed this

Twenty-ninth Day of August, 1989

Attest:

DONALD J. QUIGG

Attesting Officer

Commissioner of Patents and Trademarks